US009716603B2

(12) United States Patent
Vidal

(10) Patent No.: US 9,716,603 B2
(45) Date of Patent: Jul. 25, 2017

(54) FRAMING SCHEME FOR CONTINUOUS OPTICAL TRANSMISSION SYSTEMS

(71) Applicant: MULTIPHY LTD., Ness-Ziona (IL)

(72) Inventor: Or Vidal, Kfar Yona (IL)

(73) Assignee: MULTIPHY LTD., Ness-Ziona (IL)

( * ) Notice: Subject to any disclaimer, the term of this patent is extended or adjusted under 35 U.S.C. 154(b) by 0 days.

(21) Appl. No.: 15/175,968

(22) Filed: Jun. 7, 2016

(65) Prior Publication Data

US 2016/0359644 A1     Dec. 8, 2016

Related U.S. Application Data

(60) Provisional application No. 62/172,288, filed on Jun. 8, 2015.

(51) Int. Cl.
*H04B 10/58* (2013.01)
*H04L 25/03* (2006.01)
*H04B 10/66* (2013.01)
*H04B 10/27* (2013.01)

(52) U.S. Cl.
CPC ....... *H04L 25/03019* (2013.01); *H04B 10/27* (2013.01); *H04B 10/58* (2013.01); *H04B 10/66* (2013.01)

(58) Field of Classification Search
CPC ........ H04B 10/27; H04B 10/58; H04B 10/66; H04L 25/03019
USPC ....................................................... 398/159
See application file for complete search history.

(56) References Cited

U.S. PATENT DOCUMENTS

| 7,499,509 | B2 * | 3/2009 | Zhidkov | H04L 27/2647 375/134 |
| 8,526,458 | B1 * | 9/2013 | Jensen | H04L 27/2631 370/432 |
| 2005/0265290 | A1 * | 12/2005 | Hochwald | H04B 7/0626 370/335 |
| 2007/0014377 | A1 * | 1/2007 | Pirak | H04L 25/0226 375/267 |

(Continued)

*Primary Examiner* — Dalzid Singh
(74) *Attorney, Agent, or Firm* — FisherBroyles, LLP; Robert Kinberg

(57) ABSTRACT

An optical communication system with nonlinear equalization capability for equalizing distortions of a data communication channel, which comprises a processor for periodically gathering a predetermined number of consecutive data segments from an input data stream to a group and adding a known pilot sequence to the group, thereby forming a data frame; an optical transmitter at the input of the channel, for transmitting the data frames to a receiver, over the channel; a receiver at the output of the channel, for detecting the transmitted frames, the receiver including a demodulator. The demodulator is adapted to recover the pilot sequence of each frame; compare each recovered pilot sequence which its corresponding original transmitted pilot sequence; extract the current Channel State Information indicative of changes in the channel distortion, using the comparison results; use changes in the Channel State Information for updating the coefficients of the estimator and of the equalizer, every time a frame is received; and equalize the channel estimator and of said equalizer, every time a frame is received; and equalize the channel using the equalizer coefficients, and based on the current Channel State Information.

7 Claims, 2 Drawing Sheets

(56) References Cited

U.S. PATENT DOCUMENTS

| | | | |
|---|---|---|---|
| 2010/0232788 A1* | 9/2010 | Cai | H04B 10/61 398/25 |
| 2015/0043926 A1* | 2/2015 | Levy | H04B 10/60 398/202 |
| 2015/0229410 A1* | 8/2015 | Magri | H04B 10/25133 398/26 |
| 2015/0372766 A1* | 12/2015 | Yoshida | H04B 10/2507 398/193 |

* cited by examiner

FRAMING SCHEME FOR CONTINUOUS OPTICAL TRANSMISSION SYSTEMS

CROSS-REFERENCE TO RELATED APPLICATION

This application claims the benefit of U.S. Provisional Application No. 62/172,288, filed Jun. 8, 2015, the disclosure of which is incorporated herein by reference in its entirety.

FIELD OF THE INVENTION

The present invention relates to the field of high-speed communication systems. More particularly, the invention relates to a framing scheme for continuous optical transmission systems.

BACKGROUND OF THE INVENTION

Optical and other high-speed communication channels suffer from dispersion which changes the shape of pulses which encode symbols being transmitted. Dispersion and pulse shape changes arise from the fact that different frequency components propagate at different velocities. This phenomenon causes Inter-Symbol Interference (ISI) between neighboring pulses, and ISI limits the number of discrete amplitude levels for symbol pulses which can be successfully detected. Equalization is a way of eliminating or reducing ISI.

If the exact characteristics of the channel are known, ISI can be eliminated or reduced substantially by using a pair of filters, one at the transmitter which does pre-channel equalization, and one at the receiver does post-channel equalization, so as to control the pulse shape distortion. If the filter characteristics of these filters are set correctly, the transmit filter pre-distorts the pulse shapes so that the distortions in the channel do not cause ISI at the sample instants and the receive filter takes care of any remaining ISI noise before each received symbol is fed to the slicer for decision.

However, the characteristics of the channel are rarely known in advance, and are time-varying. In addition, there is always imprecision that arises in implementation of the filters. Therefore, there is always some distortion such that ISI will limit the data rate of the system. To compensate for this residual distortion, equalization is performed, using an equalizer (a type of filter).

In general, equalization at the receiver side is much more popular than pre-equalization at the transmitter side, because it saves the need to inform the transmitter of the exact channel conditions.

Equalizers are adaptive usually to adjust to time varying conditions for ISI reduction. Adaptive Finite Impulse Response (FIR) equalizers are digital tapped delay line filters with impulse responses defined by the tap weights, called the filter coefficients.

The adaptive equalization process involves setting tap weights, decoding data symbols and/or receiving training data and processing it to determine whether slicer errors are occurring or will occur in reception of the data, then altering the tap weights and, sometimes, processing the training data again to determine if the number of errors was reduced. The process of adapting the tap weights to change the filter characteristics continues, until the number of errors at the receiver side is minimized (a convergence state). Typically, adaptation is achieved by observing the error between the desired pulse shape and the actual pulse shape at the output of the equalizer filter, measured at the sampling instants, and then using this error to determine the direction in which the tap weights should be altered to approach an optimum set of values.

Wireless communication systems use a popular approach called training sequence (or pilot sequence) for channel equalizer coefficients setting, where a known signal is transmitted and the channel state is estimated using the combined knowledge of the transmitted and received signal. Generally, the use of training sequences allows reliable and robust tracking of changes in the channel state. Since in wireless communication systems the channel conditions vary rapidly, instantaneous Channel State Information (CSI—known channel properties of a communication link, which needs to be estimated on a short-term basis) also varies rapidly. Therefore, blind equalization (in which there is no available prior knowledge about the channel properties) is not sufficient for wireless systems.

On the other hand, wired communication systems do not use training sequences to estimate distortions in the communication channel, and equalization is mostly based on blind equalization, since changes in the CSI are very slow and there is sufficient time to perform good tracking (of changes). Blind equalization is a digital signal processing technique in which the equalizer coefficients are updated without any knowledge of the specific symbols that were transmitted (except for the symbol constellation) and no knowledge regarding the channel state (except for an initial guess used to compute an initial equalizer). This procedure includes initial equalization of the samples using the initial equalizer, decoding the symbols and using the decoded symbols to improve the equalizer coefficients.

In optical communication, robust tracking requires relatively good channel conditions (at least at the beginning of blind equalization process). However, the channel conditions in optical communication links are relatively very difficult to equalize (due to severe distortions) and therefore, the accuracy and reliability of channel tracking will not be sufficient for effective and robust equalization.

It is therefore an object of the present invention to provide accurate and robust channel tracking technique, for achieving effective and robust equalization of optical communication channels.

Other objects and advantages of the invention will become apparent as the description proceeds.

SUMMARY OF THE INVENTION

The present invention is directed to an optical communication system with nonlinear equalization capability for equalizing distortions of a data communication channel, that comprises:
a) a processor for periodically gathering a predetermined number of consecutive data segments from an input data stream to a group and adding a known pilot sequence to the group, thereby forming a data frame;
b) an optical transmitter at the input of the channel, for transmitting the data frames to a receiver, over the channel;
c) a receiver at the output of the channel, for detecting the transmitted frames, the receiver including a demodulator, which is adapted to:
a.1) recover the pilot sequence of each frame;
a.2) compare each recovered pilot sequence which its corresponding original transmitted pilot sequence;

a.3) extract the current Channel State Information indicative of changes in the channel distortion, using the comparison results;

a.4) use changes in the Channel State Information for updating the coefficients of the estimator and of the equalizer, every time a frame is received; and a.5) equalize the channel using the equalizer coefficients, and based on the current Channel State Information.

The processor may be further adapted to create super-frames, to be transmitted, from all frames that include a pilot sequence that is different from the pilot sequences of all other frames.

The channel may be equalized using a Feed Forward Equalizer, Decision Feedback Equalizer (DFE) and/or an MLSE.

In one aspect, a set of different pilot sequences is used periodically whenever a new super-frame is created.

Robustness against pattern depended effects is increased using pilot sequences with different spectral and temporal characteristics.

The spacing between the pilot sequences is determined according to the rate of change in the channel's CSI.

The present invention is also directed to a method for equalizing distortions of a data communication channel, according to which a predetermined number of consecutive data segments is periodically gathered from an input data stream to a group, while adding a known pilot sequence to the group, thereby forming a data frame. The data frames are transmitted to a receiver, over the channel, detected by the receiver and the pilot sequence of each frame are recovered. Each recovered pilot sequence is compared which its corresponding original transmitted pilot sequence and the current Channel State Information indicative of changes in the channel distortion is extracted, using the comparison results. Changes in the Channel State Information are used for updating the coefficients of the estimator and the coefficients of the equalizer, every time a frame is received. Then the channel is equalized using to the current equalizer coefficients, based on Channel State Information.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention proposes a system and method for accurate and robust channel tracking technique, for achieving effective and robust equalization of optical communication channels.

The solution proposed by the present invention uses a set of training sequences, which are periodically added to the transmitted data (to the symbols). This is done by performing the following steps, which add required signals to the raw data (symbols) as overhead. At the first step, an appropriate Forward Error Correction (FEC—a technique used for controlling errors in data transmission over unreliable or noisy communication channels) circuit is added to the transmitter as internal channel code redundancy. The added FEC circuit improves the overall sensitivity and may reduce the requirements from other equalization elements. At the second step, the data to be transmitted is segmented by dividing it into groups of symbols called segments. The symbols from one segment are transmitted one after the other between every two consecutive segments. The symbols in a specific segment undergo decoding together by a Maximum-Likelihood Sequence Estimation (MLSE) equalizer at the receiver side. A typical segment length may be, for example, 128 symbols.

At the next step, a number of consecutive data segments are grouped together and one segment of known pilot sequence (a training sequence used for reliable acquisition and channel tracking) is added to every group, there by forming a "frame". A typical example of a frame includes 399 data segments and one training segment. Some bits in the training segment may be dedicated for control (for indicating which actual Modulation and Coding Scheme is used, which FEC scheme is used, etc.) and will not be available for tracking.

According to one embodiment, a set of different pilot sequences are added periodically to every group. The use of different pilot sequences instead of one sequence, increases robustness against fixed pattern noise that may be coupled with a specific sequence. Also, this kind of data structure is less detectable to simple frequency analysis and thus more robust to narrowband interference at a specific frequency. A group of consecutive frames, starting with a specific training sequence and using all the optional (and different) training sequences once forms a super-frame (which is a group of consecutive data segments between which there are different pilot sequences). The proposed super-frame structure may also be used to initialize the sequence of a scrambler (a scrambler is a device that transposes or inverts signals or otherwise encodes a message at the sender's side to make the message unintelligible at a receiver, if not equipped with an appropriately set descrambling device). The spacing between the pilot sequences is determined according to the rate of change in the channel's CSI, reflected as "jitter" (Jitter is any deviation in, or displacement of, the signal pulses in a high-frequency digital signal).

Figure 1:
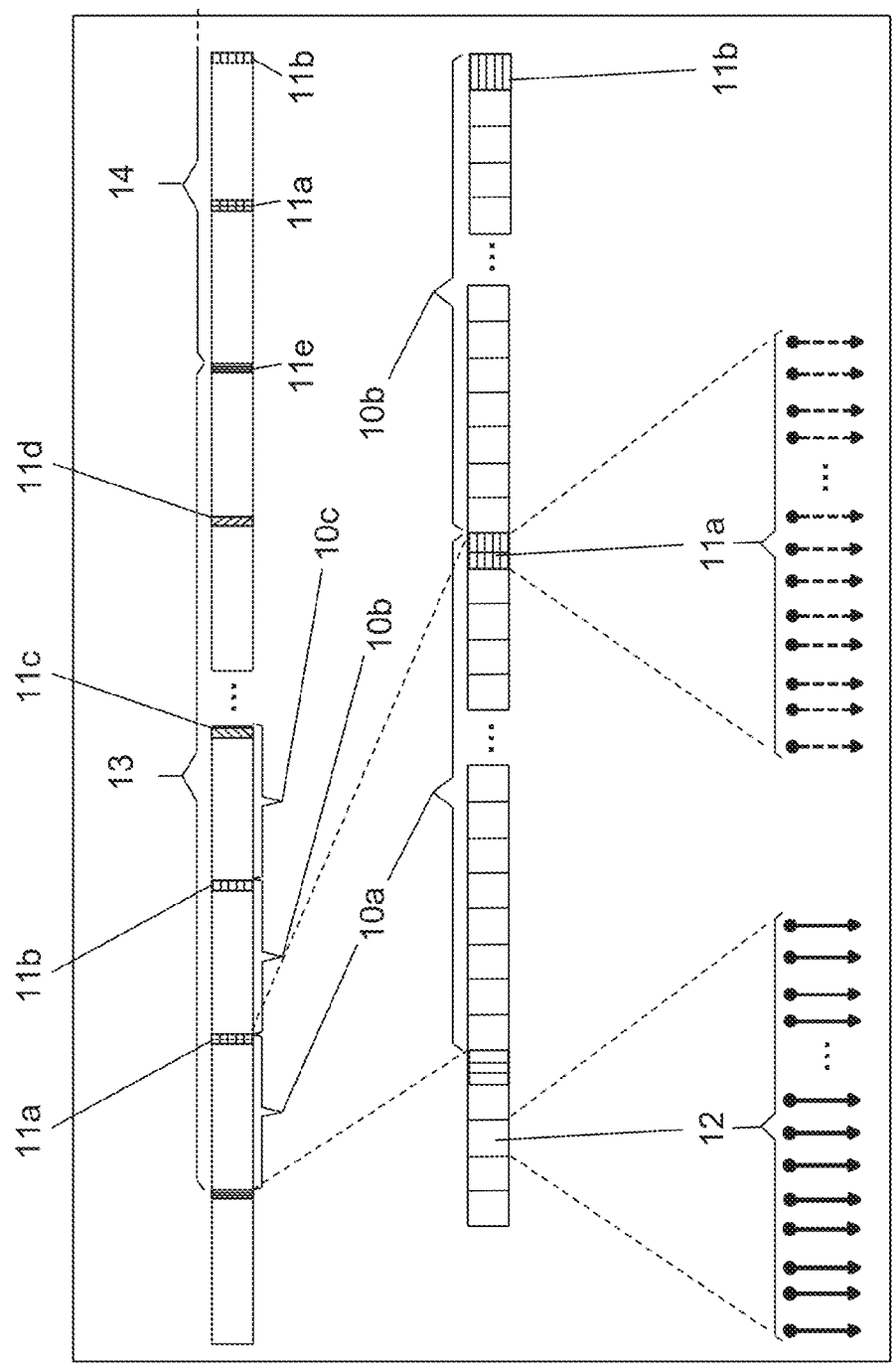
FIG. 1 illustrates the data structure of a frame and a super-frame that includes periodic pilot sequences, according to an embodiment of the invention.

FIG. 1 illustrates the data structure of a frame and a super-frame that includes periodic pilot sequences, according to an embodiment of the invention. In this example, a frame 10a consists of N (=128 in this example) data symbols (raw data segments) such as segment 12 and one pilot (training) sequence 11a at the end. Similarly, a subsequent frame 10b consists of N (=128 in this example) data symbols and one pilot (training) sequence 11b at the end, which is different from 11a (each symbol is a basic data segment). This structure is foregoing similarly for the next frames. In this example, there is a set of five different pilot (training) sequences, 11a-11e, which are used to form a super-frame 13. The same set is used in a repetitive manner, to form the subsequent super-frame 14 and so forth.

The number of data segments between any consecutive training segments (i.e., the number of data segments in one frame) should be optimized to satisfy the following requirements:

1) Timing loop maximal tracking rate
2) Minimal overhead and software implementation of as many tracking algorithms as possible
3) Link recovery requirements for the application.

The number of frames in a super frame is optimized to satisfy the following requirements:
1) Enough training sequence statistics to cover all symbol sequences for moment tracking
2) Duration of frame detection
3) Scrambling sequence length
4) Memory requirements for training sequences and derived pre-defined data.

Figure 2:
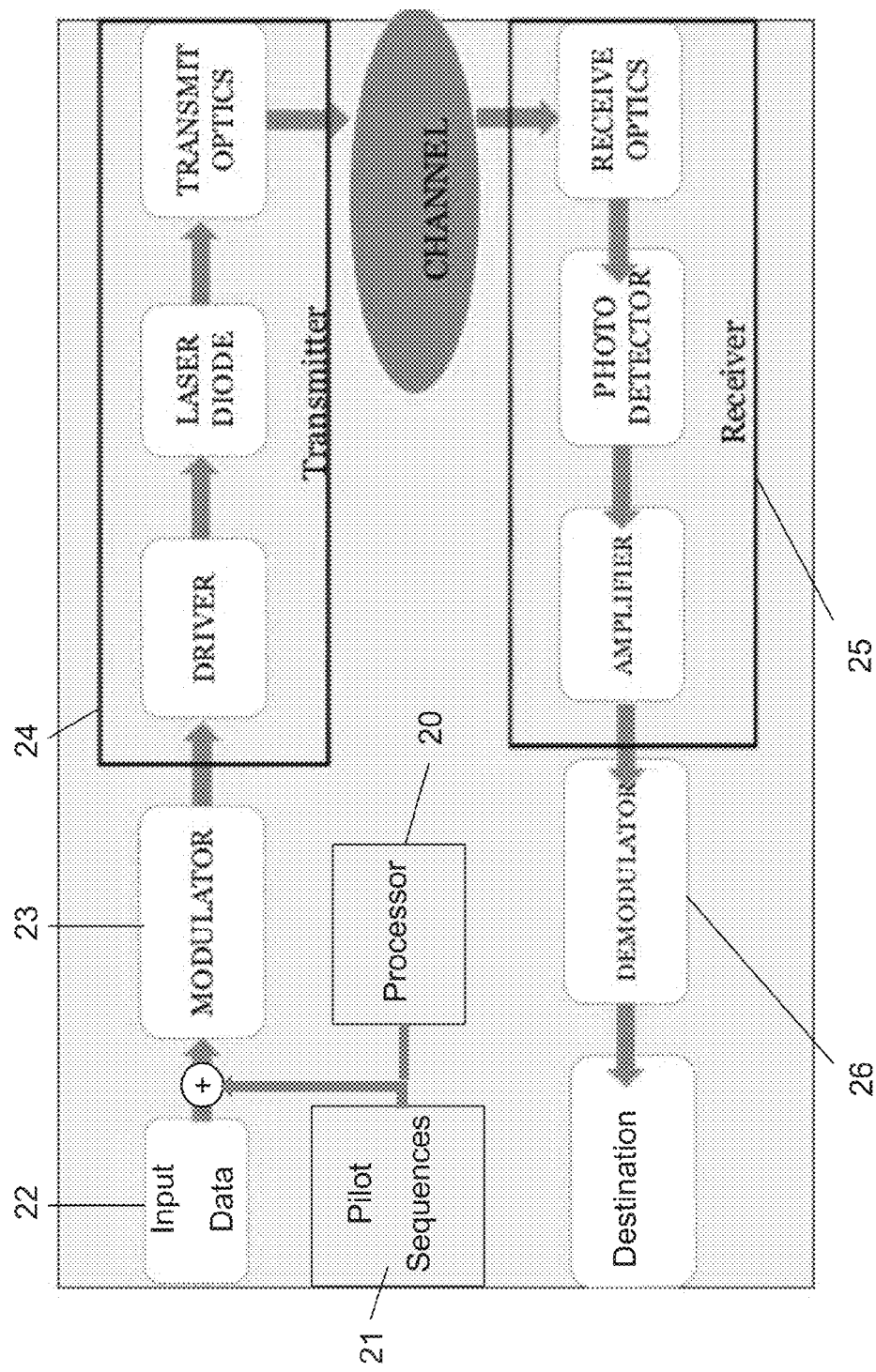
FIG. 2 shows a block diagram of an optical communication system with an optical transmitter that transmits super-frames to an optical receiver, over an optical channel.

FIG. 2 shows a block diagram of an optical communication system with an optical transmitter that transmits super-frames to an optical receiver, over an optical channel. A processor 20 periodically gathers a number of consecutive data segments from the input data 22 and adds one segment of known pilot sequence (selected from a set containing different pilot sequences 21) to every group, thereby forming the "frame" (shown in FIG. 1). The processor 20 repeats the process while each time, adding another frame which includes a different pilot sequence, until all pilot sequences of the set are used. At this point, all frames with different pilot sequence are gathered, thereby forming the "super-frame" (shown in FIG. 1). The receiver 25 detects the transmitted frames or super-frames and forwards the received data to the demodulator 26 (which may use for example, a Feed Forward Equalizer—FFE a Decision Feedback Equalizer (DFE) or an MLSE), which recovers the (known) pilot sequence of each frame, compares each recovered pilot sequence which the corresponding original transmitted pilot sequence and extracts the Channel State Information (which is indicative of changes in the channel distortion) using the comparison results. The changes in the Channel State Information are then used to update the coefficients of the FFE (or of the MLSE), in order to get optimal channel equalization. This way, the optical communication system uses the pilot sequence attached to each frame to track these changes and update the equalization process every time a frame or a super-frame is received.

The processor is allowed to determine whether the modulator 23 will receive input data segments (symbols) as frames or as super-frames that will be transmitted over the channel by the transmitter 24. In any case, periodically adding a training sequence to any data segment to be transmitted substantially improves the channel tracking capability, required for achieving effective and robust channel equalization.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. An optical communication system with nonlinear equalization capability for equalizing distortions of a data communication channel, comprising:
   a) a processor for periodically gathering a predetermined number of consecutive data segments from an input data stream to a group and adding a known pilot sequence to said group, thereby forming a data frame;
   b) an optical transmitter at the input of said channel, for transmitting said data frames to a receiver, over said channel;
   c) a receiver at the output of said channel, for detecting the transmitted frames, said receiver including a demodulator, which is adapted to;
      a.1) recover the pilot sequence of each frame;
      a.2) compare each recovered pilot sequence which its corresponding original transmitted pilot sequence;
      a.3) extract the current Channel State Information indicative of changes in the channel distortion, using the comparison results;
      a.4) use changes in said Channel State Information for updating the coefficients of said estimator and of said equalizer, every time a frame is received; and
      a.5) equalize said channel using the equalizer coefficients, and based on said current Channel State Information.

2. A system according to claim 1, in which the processor is further adapted to create super-frames, to be transmitted, from all frames that include a pilot sequence that is different from the pilot sequences of all other frames.

3. A system according to claim 2, in which a set of different pilot sequences is used periodically whenever a new super-frame is created.

4. A system according to claim 3, in which robustness against pattern depended effects is increased using pilot sequences with different spectral and temporal characteristics.

5. A system according to claim 3, in which the spacing between the pilot sequences is determined according to the rate of change in the channel's CSI.

6. A system according to claim 1, in which the channel is equalized using a Feed Forward Equalizer (FFE), a Decision Feedback Equalizer(DFE) or an MLSE.

7. A method for equalizing distortions of a data communication channel, comprising:
   a) periodically gathering a predetermined number of consecutive data segments from an input data stream to a group and adding a known pilot sequence to said group, thereby forming a data frame;
   b) transmitting said data frames to a receiver, over said channel;
   c) detecting the transmitted frames;
   d) recovering the pilot sequence of each frame;
   e) comparing each recovered pilot sequence which its corresponding original transmitted pilot sequence;
   f) extracting the current Channel State Information indicative of changes in the channel distortion, using the comparison results;
   g) using changes in said Channel State Information for updating the coefficients of said estimator and of said equalizer, every time a frame is received; and
   h) equalizing said channel using the equalizer coefficients, and based on said current Channel State Information.

* * * * *